United States Patent
Levy et al.

(10) Patent No.: US 11,494,808 B2
(45) Date of Patent: Nov. 8, 2022

(54) ANONYMIZING POTENTIALLY SENSITIVE DATA

(71) Applicant: ANAGOG LTD., Tel Aviv (IL)

(72) Inventors: Gil Levy, Ramot Meir (IL); Yaron Aizenbud, Haifa (IL)

(73) Assignee: ANAGOG LTD., Tel Aviv (IL)

( * ) Notice: Subject to any disclaimer, the term of this patent is extended or adjusted under 35 U.S.C. 154(b) by 155 days.

(21) Appl. No.: 16/304,200

(22) PCT Filed: May 27, 2017

(86) PCT No.: PCT/IL2017/050589
§ 371 (c)(1),
(2) Date: Nov. 23, 2018

(87) PCT Pub. No.: WO2017/208226
PCT Pub. Date: Dec. 7, 2017

(65) Prior Publication Data
US 2020/0320574 A1     Oct. 8, 2020

Related U.S. Application Data

(60) Provisional application No. 62/342,922, filed on May 28, 2016.

(51) Int. Cl.
*G06Q 30/02*     (2012.01)
*H04W 4/23*     (2018.01)
*H04W 4/02*     (2018.01)

(52) U.S. Cl.
CPC ..... *G06Q 30/0269* (2013.01); *G06Q 30/0201* (2013.01); *G06Q 30/0261* (2013.01);
(Continued)

(58) Field of Classification Search
CPC ........... G06Q 30/0269; G06Q 30/0267; G06Q 30/0261; G06Q 30/0201; H04W 4/025; H04W 4/23
(Continued)

(56) References Cited

U.S. PATENT DOCUMENTS

2008/0072139 A1 * 3/2008 Salinas ............... G06F 16/9577
715/238
2011/0187497 A1 * 8/2011 Chin ........................ H04L 9/32
340/5.54
(Continued)

FOREIGN PATENT DOCUMENTS

CA     2826902 A1 * 3/2014 ......... G06Q 20/3224

OTHER PUBLICATIONS

Benjamin Saunders, Anonymising interview data: challenges and compromise in practice (Year: 2015).*
(Continued)

*Primary Examiner* — Tarek Elchanti

(57) ABSTRACT

A computer program product, method and mobile device, the computer program product comprising a non-transitory computer readable storage medium retaining program instructions configured to cause a processor to perform actions, wherein the processor is a processor of a mobile device of a user, wherein the mobile device is in communication with a server associated with an entity other than the user, wherein the server is in communication with a plurality of mobile devices, each of which retaining the computer program product, wherein the program instructions implement: subject to an occurrence of an event associated with the user of the mobile device, obtaining data to be transmitted to the server, wherein the event is of interest to the entity, wherein the data to be transmitted comprises demographic information of the user and a property of the event,
(Continued)

Figure 1:
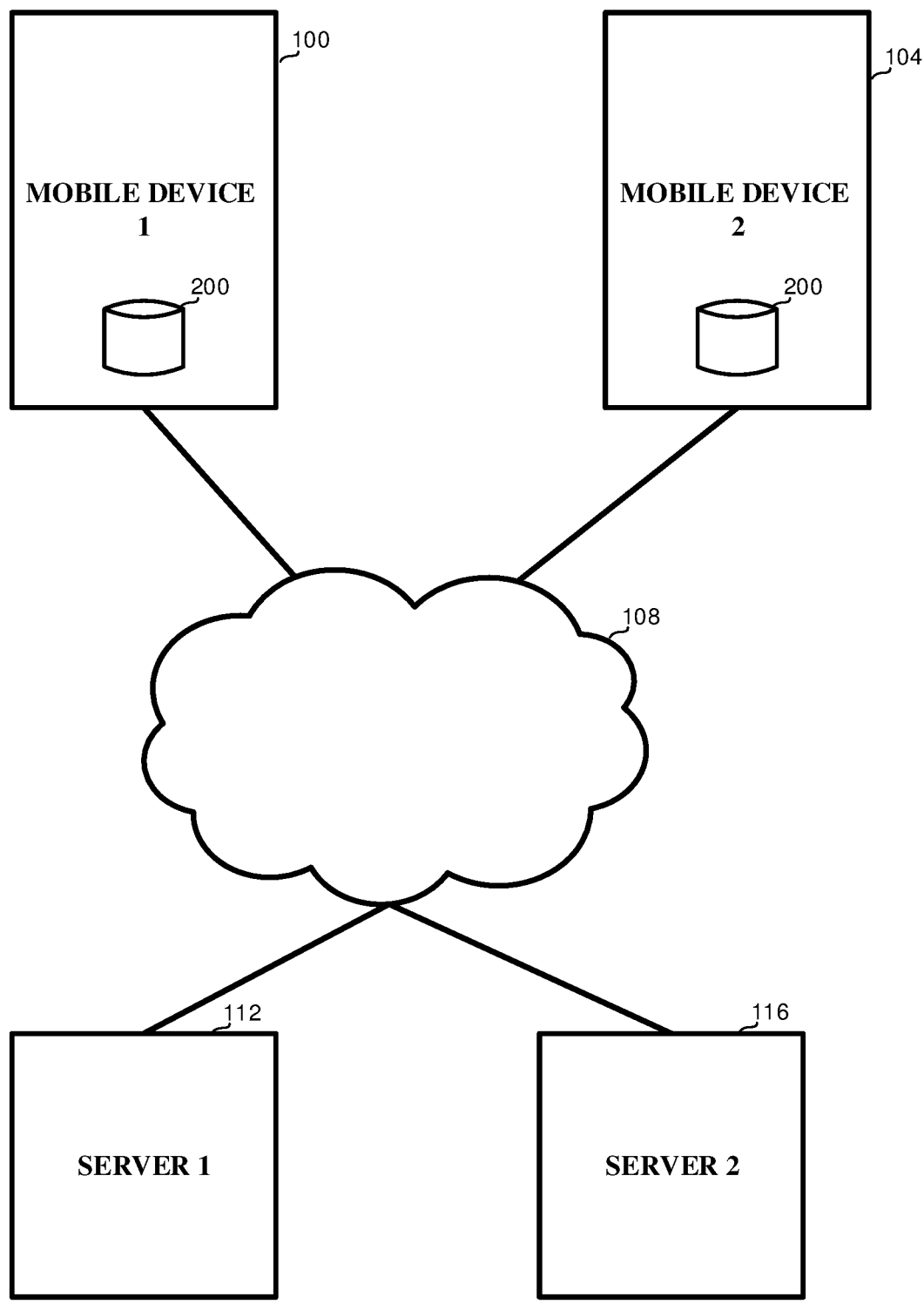

wherein the data excludes identifying information; and transmitting the data to the server.

17 Claims, 3 Drawing Sheets

(52) U.S. Cl.
CPC ........ G06Q 30/0267 (2013.01); H04W 4/025 (2013.01); H04W 4/23 (2018.02)

(58) Field of Classification Search
USPC ........ 705/14.66; 706/47; 715/238; 340/5.54; 455/456.3; 709/217
See application file for complete search history.

(56) References Cited

U.S. PATENT DOCUMENTS

| | | | | |
|---|---|---|---|---|
| 2013/0024542 A1* | 1/2013 | Keller | ................ | G05B 19/0428 709/217 |
| 2014/0135037 A1* | 5/2014 | Dave | ....................... | H04W 4/21 455/456.3 |
| 2014/0344205 A1* | 11/2014 | Luna | ..................... | G06N 5/025 706/47 |

OTHER PUBLICATIONS

Benjamin Saunders, Anonymising interview data: challenges and compromise in practice, 2015 (Year: 2015).*

* cited by examiner

ANONYMIZING POTENTIALLY SENSITIVE DATA

CROSS-REFERENCE TO RELATED APPLICATION

This application claims the benefit of U.S. Provisional Patent Application No. 62/342,922, filed May 28, 2016, entitled "Privacy Protection", which is hereby incorporated by reference in its entirety for all purposes without giving rise to disavowment.

TECHNICAL FIELD

The present disclosure relates to privacy protection in general, and to protecting the privacy of users of mobile devices in particular.

BACKGROUND

Mobile computerized devices have become a necessity which most people in the developed and developing world count on and use for almost any purpose, including but not limited to reading e-mails, communicating with friends and business associates using social networks, keeping their calendar, navigating, shopping, listening to music, watching videos and many other activities. Thus, a mobile device of a typical user retains significant information about its user and the user's habits, activities, locations in which the user was present, searches the user performed, items the user bought or intends to buy, contacts of the user, and a lot of additional information of multiple types.

Thus, many users are justly worried about loss of their privacy, due to some of the information being provided to entities, such as commercial companies, financial institutes, governmental organizations or the like. Some private information, for example shopping habits, may pose a nuisance to a user if leaked to a commercial company, while other information, such as visited locations, can seriously jeopardize aspects of the user's life, such as the user's family, work, or others.

BRIEF SUMMARY

One exemplary embodiment of the disclosed subject matter is a computer program product comprising a non-transitory computer readable storage medium retaining program instructions configured to cause a processor to perform actions, wherein the processor is a processor of a mobile device of a user, wherein the mobile device is in communication with a server associated with an entity other than the user, wherein the server is in communication with a plurality of mobile devices, each of which retaining the computer program product, wherein the program instructions implement: subject to an occurrence of an event associated with the user of the mobile device, obtaining data to be transmitted to the server, wherein the event is of interest to the entity, wherein the data to be transmitted comprises demographic information of the user and a property of the event, wherein the data excludes identifying information; and transmitting the data to the server. Within the computer program product, the server is optionally configured to receive transmissions from the plurality of mobile devices, whereby the server collects aggregative anonymous data based on sensitive data without being privy to the sensitive data relating to each user of each of the plurality of mobile devices. Within the computer program product, the program instructions can further implement causing the processor to identify the event based on sensitive data associated with the user. Within the computer program product, the sensitive data optionally comprises one or more locations at which the user was present. Within the computer program product, the event is optionally identified by performing on-board processing by the mobile device of raw data or sensitive data, wherein the raw data or sensitive data is retained on the mobile device, wherein the server is not privy to the raw data. Within the computer program product, the raw data is optionally location data obtained by a positioning sensor of the mobile device, and wherein said processing comprises computing a distance. Within the computer program product, the sensitive data is optionally a user-associated location and wherein the distance is between a location of the mobile device obtained by the positioning sensor and the user-associated location. Within the computer program product, the user-associated location is optionally a home of the user, a work place of the user, a parking spot of the user, or a place the user visits regularly. Within the computer program product, the raw data is optionally a history of locations of the mobile device, and the processing optionally comprises analyzing the history of locations of the mobile device. Within the computer program product, the program instructions can further implement a machine learning classifier for estimating the demographic information, based on raw data retained locally on the mobile device, wherein the server is not privy to the raw data. Within the computer program product, the event optionally comprises displaying an advertisement to the user, and wherein the program instructions further implement matching, by the mobile device, the advertisement to be displayed to the user, wherein said matching is performed on-board the mobile device, with respect to a local repository of advertisements. Within the computer program product, said local repository of advertisements optionally comprises one or more rules indicting for each advertisement a condition for displaying the advertisement. Within the computer program product, the matching is optionally based on sensitive data associated with the user wherein the sensitive data is retained locally in the mobile device, and wherein the server is not privy to the sensitive data. Within the computer program product, the sensitive data optionally comprises one or more locations of the mobile device. Within the computer program product, the sensitive data optionally comprises browsing history, content of messages, content of e-mails or social networks activity. Within the computer program product, the sensitive data is optionally obtained by on-board processing by the mobile device of raw data, wherein the raw data is retained on the mobile device, wherein the server is not privy to the raw data. Within the computer program product, the matching is optionally preformed when the mobile device has no network connectivity. Within the computer program product, the event optionally comprises suggesting to the user a specific service or product. Within the computer program product, the specific service or product is optionally suggested based on a current state or action of the user.

One exemplary embodiment of the disclosed subject matter is a method to be performed by a processor of a mobile device of a user, wherein the mobile device is in communication with a server associated with an entity other than the user, wherein the server is in communication with a plurality of mobile devices, the method comprising executing the program instructions as above.

Another exemplary embodiment of the disclosed subject matter is a mobile device used by a user, the mobile device comprising a storage device retaining the computer program product as above.

THE BRIEF DESCRIPTION OF THE SEVERAL VIEWS OF THE DRAWINGS

Figure 2:
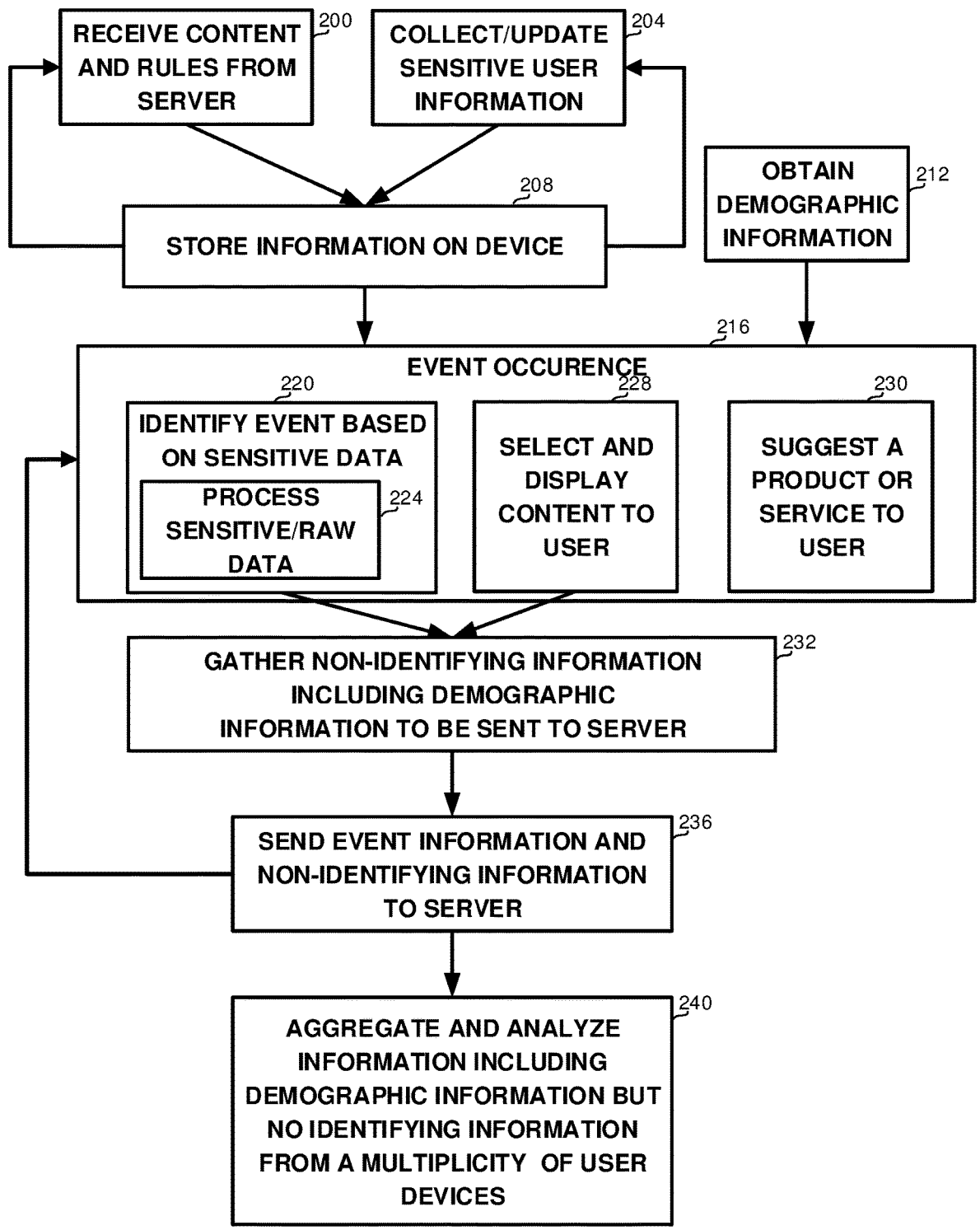
Figure 3A:
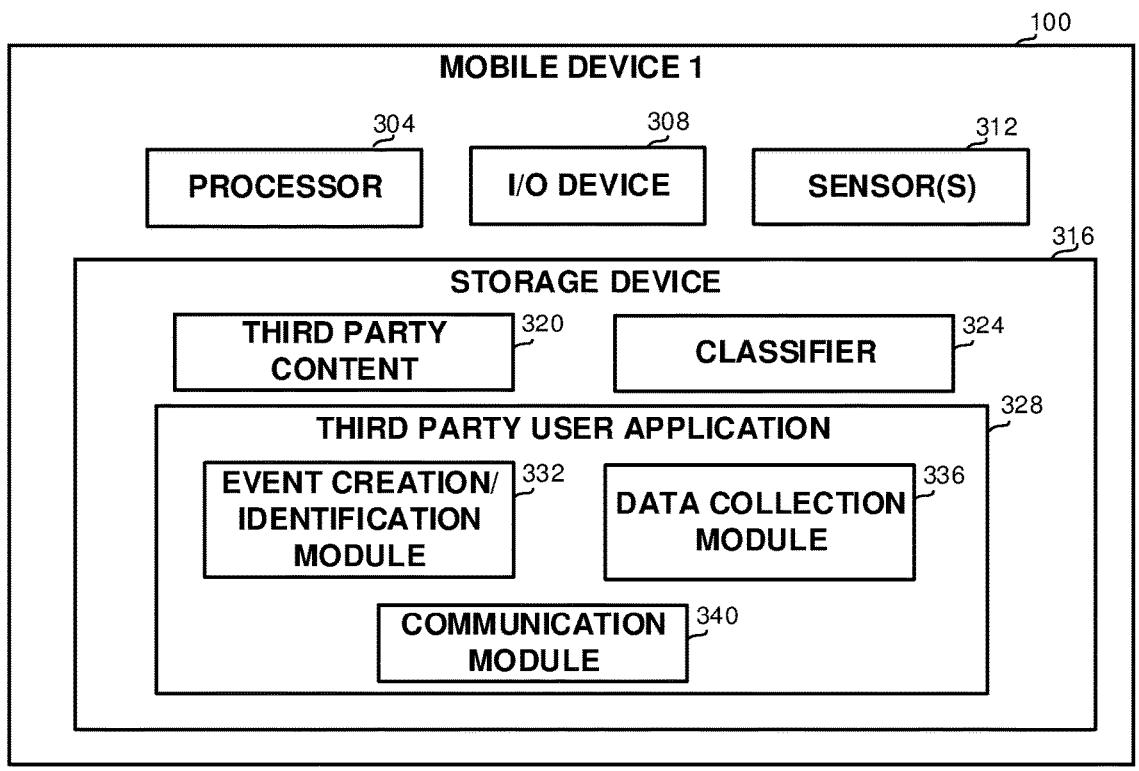
Figure 3B:
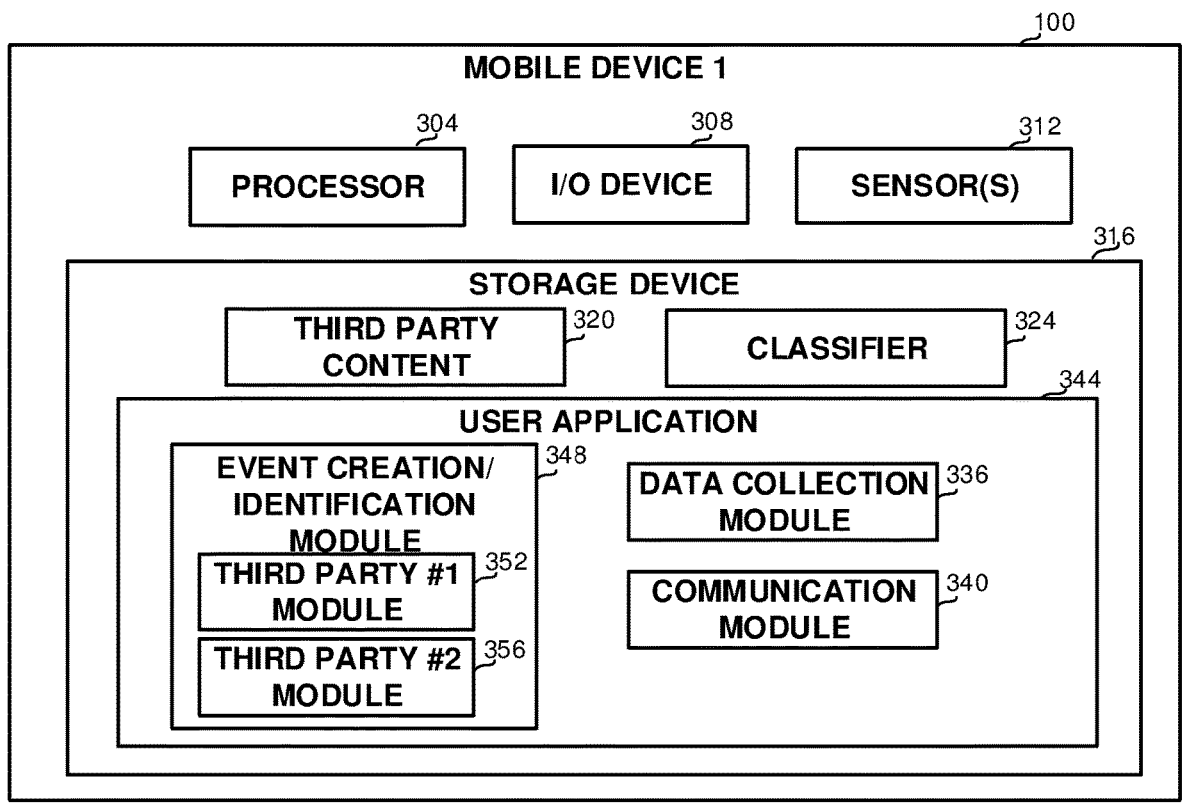

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1 is a schematic illustration of an environment in which the discloses subject matter can be used, in accordance with some exemplary embodiments of the disclosed subject matter;

FIG. 2 is a flowchart of the main steps in a method for obtaining sensitive data of a user while maintaining user privacy, in accordance with some embodiments of the disclosed subject matter; and FIGS. 3A and 3B are schematic block diagrams of mobile device in accordance with a first and second exemplary implementations of an apparatus, in accordance with some embodiments of the disclosed subject matter.

DETAILED DESCRIPTION

The term "identifying information" used in this specification should be expansively construed to cover any data that alone, or in conjunction with additional data can be used for identifying a person. Identifying data may comprise a name, an identifying number, a social security number, a phone number, a mailing address, an e-mail addresses, account number(s), user names for applications or services, other data items or any combination thereof.

The term "demographic information" used in this specification should be expansively construed to cover any data that associated with a user, wherein the data provides characteristic of a user but does not enable identification of the user. Thus, demographic information may include gender, age or age group, a non-identifying indication to where the user lives, for example a city the user lives in, a profession of the user, family status, or the like.

The term "raw data" used in this specification should be expansively construed to cover any data obtained from a sensor or from another usage of a mobile device, wherein the data alone does not provide indication of a user, such as geographic location in the form of coordinates, mobility status such as whether the user is static or moving and in what speed, web sites visited by the user, items purchased by the user, typical walking pace of the user, or the like.

The term "sensitive data" used in this specification should be expansively construed to cover any data obtained about a user, which relates to activities of the user without identifying the user, for example locations visited by the user, browsing history, shopping habits of the user, content of messages or e-mails, social networks activity, or the like. Some raw data, such as visited web sites may also be considered sensitive data. Leaking of sensitive data associated with a user can pose a problem for a user if the user is identified or can be identified, but it may be harmless if the user is anonymous. Sensitive data may be obtained from raw data, for example by crossing a user's locations with data from a mapping system thus obtaining an address or an indication to a location such as an institute, from application usage, for example a shopping list, or in any other manner. Sensitive data may be retained at least partly or at least for a predetermined period of time on the device.

One technical problem handled by the disclosed subject matter is the need to retain the privacy of a user using a mobile device, such that sensitive data that can be attributed to the user will not be provided to a third party.

Another technical problem is the need to enable third parties, such as commercial, financial governmental or other entities, to receive indications to sensitive data of a multiplicity of users without identifying information. Thus, a third party can analyze aggregated data, in order to get insight to the users' activities and take actions such improving their services or their business, without jeopardizing the users' privacy. In some cases, the third party may not be privy to sensitive data in a manner that is attributable to a specific user.

Yet another technical problem is the need to provide user-target functionality that is based on sensitive data, while maintaining the user's privacy. In some cases, location-based services may be useful for the user. However, the user may not be interested in exposing her location over time and allowing a third party to track her every move.

One technical solution relates to obtaining demographic information about one or more users by their mobile devices, and providing this information to the third party in response to an event associated with the third party, without providing any identifying information of the users, thus maintaining their privacy, while providing useful data upon which the third party can operate.

An event can be a one-time occurrence, such as the user entering premises associated with the third party, a user buying a product of a third party, a user interested in a product of a third party, the user being in at least a predetermined distance from the user's home, or the like.

In further embodiments, the event can be an aggregation of a multiplicity of occurrences collected by the mobile device over time, which the third party cannot otherwise obtain without collecting identifying information. For example, a store chain cannot figure out how many times a specific user has visited its stores, without receiving and retaining identifying information of the user. However, this information can be collected and retained on the mobile device over time, and then reported to the third party, accompanied by demographic information of the user but without any identifying information.

In other embodiments, an event can be an occurrence performed by the device. For example, a third party may pre-provide a variety of content items, such as advertisements in the form of audio, video or images to a user's device. A module executed by the mobile device can then determine, based upon sensitive data, demographic information or even identifying information which of the content items are suitable for the user, and may show or play these items. The third party can then be notified which and in how many occurrences content items have been played to the user in a predetermined time frame, such as one day, one month, or the like together with the user's demographic information, but without any identifying information of the user.

The functionality of identifying the events or selecting the content to show may be implemented by a standalone application, or embedded in other applications, such as navigation applications, or in any other manner.

One technical effect of the disclosure relates to third parties benefiting from the useful information, for purposes such as evaluating the effectiveness of the content, bookkeeping against other entities, or the like, while maintaining the privacy of the users by not transmitting any identifying user information.

The disclosed subject matter may provide for one or more technical improvements over any pre-existing technique and any technique that has previously become routine or conventional in the art.

Additional technical problems, technical solutions and technical effects may be apparent to a person of ordinary skill in the art in view of the present disclosure.

Referring now to FIG. 1, showing a schematic illustration of an environment in which some exemplary embodiments of the disclosed subject matter can be used.

The environment can comprise any number of mobile devices such as mobile device 1 (100) or mobile device 2 (104). Each mobile device 100, 104, can be used by a user (not shown). Each mobile device 100, 104 may potentially retain raw data, identifying information and sensitive information related to the user associated therewith. The mobile devices communicate through a communication channel 108, such as the Internet, with one or more servers, such as server 1 (112) or server 2 (116). Each server 112, 116 can be associated with one or more third parties, an entity providing services to one or more third parties, or the like. Each mobile device 100, 104 transmits through communication channel 108, information to servers 112, 116, wherein the information comprises sensitive information of the users possibly with demographic information but without any identifying information. The third parties can then analyze and utilize the received data, for example segment their market, analyze the number of visits people of a certain demographic characteristics have visited the third party premises in a time frame, analyze the same against the number of times particular content such as an advertisement has been displayed to that demographic group, or the like. Thus, significant conclusions can be obtained and used without being privy of sensitive information together with identifying information. In some exemplary embodiments, the server is privy only to anonymized data which can be used to derive general conclusions about a crowd, but not to sensitive information that can be used to derive a particular conclusion about a specific user.

In some exemplary embodiments, in the absence of identifying information, the server may be unable to correlate two or more separate data records. Hence, a conclusion about a specific user cannot be ascertained, as opposed to general conclusions about the general crowd or portions thereof.

Referring now to FIG. 2, showing a flowchart of the main steps in a method for obtaining sensitive data of a user while maintaining user privacy, in accordance with some embodiments of the disclosed subject matter.

The method comprises a number of preliminary steps, followed by ongoing activity of modules resident on a mobile device of the user. It will be appreciated, however, that any of the preliminary steps can be repeated continuously, periodically, upon specific instructions, in an ongoing manner, or the like.

The preliminary steps can comprise steps 200, 204, 208 and 212.

On step 200 content and rules may be received from one or more servers. The content and rules can be associated with one or more third parties. As an example, the content may comprise advertisements in the form of images, audio, video, or the like, to be displayed or played to a user. The content can also include information such as items on sale in a specific store, communication details of a taxi station or one or more hotels, or the like. The content may be any content that may be potentially served or displayed to the user. However, as opposed to what is customary, content is not matched for the user and then served to her user device, but rather is provided to the user device for a later decision of whether to serve the content to the user or not. In some cases, some or all of the content may end up not being served to the user at all. The rules may indicate which content should be presented, according to demographic or sensitive data retained on the device. The content thus need not be adapted to a specific user or to users having specific demographic characteristics. Rather, a collection of multiple content items may be provided to all users, from which the items to be displayed to each user are to be selected in compliance with the received rules. For example, a rule may indicate: "present advertisement X to men at the age group of 24-35 that went to chain store Y at least two times at lunch time over the last month". Additionally or alternatively, a rule may indicate the content type, for example "advertisement X is for baby products".

On step 204, sensitive information related to the user can be collected, for example from raw data. The information may include geographic information of the user's location, for example in the form of coordinates. The information may further include web sites visited by the user, accounts used by the user, purchased items, content of messages or e-mails, social networks activity, or the like. The sensitive data may be obtained from sensors of the mobile device, from user input provided by the user of the mobile device, or the like.

On step 208, the received content and/or the sensitive information may be stored on the device in one or more data repositories, such as a local persistent storage.

On step 212, demographic information related to the user may be obtained. The demographic information may be obtained from the identifying or sensitive data retained on the mobile device. The demographic information may be obtained by a classifier executed by the mobile device, which deduces demographic information such as gender, age group, family status, living area, or others from the data. For example, a user who often shops for baby products may be classified as a parent, a user entering technology-related web sites may be classified as having an occupation associated with the high-tech industry, or the like. It will be appreciated that classification is not limited to a single property such as family status or occupation, but rather multiple characteristics may be obtained from multiple sensitive or raw data items. Demographic estimation may be based on information that is tracked over time, from explicit user input, implicit information based on user's action, or the like.

In some exemplary embodiments, steps 200, 204, 208 and 212 can be repeated continuously, at predetermined intervals, or the like. For example, collecting sensitive information can be performed continuously such that respective events can be generated online, while obtaining demographic information can be performed every month or so. In some cases, until demographic information is ascertainable with a relatively high degree of confidence (e.g., confidence level of above 80%), demographic information may be re-computed in relatively short intervals (e.g., on a daily basis). After the threshold confidence level is reached, the demographic information may be re-computed in relatively long intervals (e.g., on a monthly basis).

On step 216, an event may occur. The occurrence of the event may be identified. Additionally or alternatively, the event may be caused by the device. Information about the event may be obtained and may later be transmitted to one or more third party servers.

One such exemplary occurrence is the identification of an event based on sensitive data on step 220. As an example, the identified event may be the entrance of the user to premises associated with a third party, a predetermined number of such entrances within a predetermined time period, purchase of a certain item or an item of a certain type, being in at least a certain distance from the user's home, office, a place visited often by the user, the last parking spot the user used, or another location, or the like. Identifying the events may include step 224 of processing sensitive or raw data, for example translating coordinates to locations, analyzing shopping lists, or the like.

Another exemplary occurring event is exemplified in step 228. On Step 228, content items are selected to be displayed to a user by the mobile device. The content items may be selected from the plurality of content items received on step 200 and stored on the device on step 208, possibly in accordance with one or more rules received on step 200. The content items may thus be selected in accordance with the demographic information as obtained on step 212, on other features ascertainable from the raw data or sensitive data. For example, if it is determined that a user is a parent, or the user has purchased children items, advertisements to children items may be displayed based on a rule related to the person being a parent or a rule indicting displaying children items to users who are purchasing children item; if it is determined that a user is a male or purchased men's clothing, advertisements to man's clothing may be displayed, or the like. In some exemplary embodiments, content matching may be performed, such as matching of an advertisement for the user. The matching may be based on a function that is attempted to be optimized. As an example, the function may be a Click Through Rate (CTR), as an estimated revenue from the advertisement, or the like. Any ad matching technique may be employed. The selection of the content to be displayed may be performed on-board the mobile device and not in any server. After the selection is performed, the content may be displayed.

It is noted that the content selection and display may be performed when the mobile device has no connectivity (e.g., Internet connection not operating; no signal).

Yet another exemplary occurring event may relate to step 230 of suggesting a specific service or a product to a user. The specific service or product may be suggested based on a current state or action of the user, such as a location, an action taken by the user, or the like.

For example, an item can be suggested to a user entering a store, a taxi may be suggested to a user being at least at a predetermined distance from the last place where the user parked, a hotel may be suggested to a user being at least at a predetermined distance from the user's home in a late hour, or the like. It is noted that the suggestion is made by the mobile device based on data retained on the device as received on step 200, without transmitting any identifying information to a third party.

On step 232, non-identifying information, including demographic information relevant to the event can be gathered, and on step 236 the event information and the non-identifying information can be transmitted to the server. Exemplary messages may indicate a male user in the age group of 30-40 has ordered a taxi in a particular neighborhood; a parent has bought at least three baby products during the last week; an advertisement to a real estate agency has been displayed to a female user in the age group of 25-30 in a certain city, or the like. In some exemplary embodiments, the non-identifying information may include also non-demographic information that is of interest to the entity associated with the server. Non-limiting examples of non-demographic information that may be transmitted to the server may include browsing history, keywords appearing in messages, social network content, a number of times the user has visited a location, a computed distance between the user and a location, shopping habits, a behavioral profile of the user, user's declared and exhibited preferences, or the like.

On step 240, which may be performed by a server associated with a third party such as server 112 or 116, data received from a multiplicity of devices, can be analyzed, as standalone or aggregated with similar data received from other users, and analyzed in order to obtain conclusions relevant to the third party. The received and analyzed information can contain information of one or more events which may be related to the third party as well as sensitive information, but no identifying information. In some exemplary embodiments, the event information may be used for billing the advertiser. The advertiser may not know the identity of the user who was served with the advertisement, but may know her demographic information. Aggregative demographic information of the audience may be provided to the advertiser, including potentially sensitive information. However, such information is never obtained in a manner which allows it to be attributed to a specific user, thereby preserving user's privacy, while leveraging sensitive information about the users to optimize ad placement and to provide useful ad analytics.

Referring now to FIG. 3A, showing a schematic block diagram of a mobile device in accordance with a first exemplary implementation of an apparatus in accordance with the disclosure.

Mobile device 100 can be any available mobile device, such as a mobile phone, a Personal Digital Assistant (PDA), a tablet, a laptop computer or the like. Mobile device 100 can comprise one or more processor(s) 304. Processor 304 may be a Central Processing Unit (CPU), a microprocessor, an electronic circuit, an Integrated Circuit (IC) or the like. Processor 304 may be utilized to perform computations required by the mobile device 100 or any of it subcomponents.

In some exemplary embodiments of the disclosed subject matter, mobile device 100 may comprise an Input/Output (I/O) component 308 such as a display, a touch screen, a microphone, a speaker, or the like. I/O component 308 may be utilized to provide and receive data to a user, for example display or play content to the user, such as advertisements or receive data from the user.

In some exemplary embodiments of the disclosed subject matter, mobile device 100 may comprise one or more sensors 312, such as a Global Positioning System (GPS) receiver, an accelerometer, a thermometer, or the like. The sensors can be used for assessing a location or any other state of the device or the environment.

In some exemplary embodiments, mobile device 100 may comprise a storage device 316. Storage device 316 may be a hard disk drive, a Flash disk, a Random Access Memory (RAM), a memory chip, or the like. In some exemplary embodiments, storage device 316 may retain program code operative to cause the processor 304 to perform acts associated with any of the subcomponents of mobile device 100. The components detailed below may be implemented as one or more sets of interrelated computer instructions, executed for example by processor 304 or by another processor. The components may be arranged as one or more executable files, dynamic libraries, static libraries, methods, functions, services, or the like, programmed in any programming language and under any computing environment.

Storage Device 316 may retain third party content 320. Third party content 320 may comprise, for example, advertisements or other content to be displayed to a user, suggestions to products or services, or the like. Third party content 320 may comprise items not suitable for the user as well as other items that are suitable, such that a multiplicity of users may receive the same collection of content items, and the decision which items to display or suggest to each user may be taken by a program executed on the device of the user, according to the demographic data of the specific user, and without transmitting identifying information of the user.

Storage device 316 may comprise a classifier 324 for extracting demographic data of the user from the raw and identifying data retained on the device. Classifier 324 may be a supervised learning classifier capable of estimating a label based on a set of features. Classifier 324 may be trained on a training set before being utilized to perform prediction. In some exemplary embodiments, the classifier may be previously trained, for example on a third party server, and may be provided to the mobile device to be used thereon. In some exemplary embodiments, the classifier 324 may be a classifier that is trained specifically for third party content 320.

In some exemplary embodiments, the demographic data may be retained on storage device 316.

Storage device 316 may retain one or more third party user applications 328 each of which may be associated with one or more third parties, for example a chain store, a hotel chain, or the like.

Third party user application 328 may comprise event creation/identification module 332 for tracking output of sensors 312, or any other activity of the user or the mobile device, such as purchasing items or visiting web sites, or being at a certain distance from a home or a parking spot, and identifying an event of interest to the third party. Additionally or alternatively, event creation/identification module 332 can be operative in selecting content to be displayed to the user and displaying the same.

Event creation/identification module 332 can identify momentary events, as well as events occurring over time, such as the user entering premises of the third party at least a predetermined number of times over a predetermined time period, the user being exposed to advertisements of the third party at least a predetermined number of times over a predetermined time period, or the like. It will be appreciated that identifying such events may require storing data, for example keeping dates at which the user visited the premises, for example together with third party content 320.

Third party user application 328 may comprise data collection module 336 for collecting data relevant to the event, for example the demographic data, times at which the user enters the premises, the specific advertisements displayed to the user, or the like.

Third party user application 328 may comprise communication module 340 for transmitting to a server associated with the third party the relevant information, including the event data and the relevant demographic information.

It will be appreciated that third party user application 328 may be common to a multiplicity of third parties, such that event creation/identification module 332 can identify or create events of relevance to a multiplicity of third parties, data collection module 336 can collect the relevant data for each such event, and communication module 340 can send the event and relevant demographic data to the corresponding third party server.

In some exemplary embodiments, the disclosed subject matter may be implemented using a Software Development Kit (SDK) that is used by various third party applications, providing such applications a functionality which tracks their users' sensitive data and utilize it for their needs while preserving users' privacy.

Referring now to FIG. 3B, showing a schematic block diagram of a mobile device in accordance with a second exemplary implementation of the disclosure.

Mobile device 100, processor 304, I/O component 308, sensors 312, storage device 316, third party content 320, classifier 324 and communication module 340 are as detailed in association with FIG. 3A above.

In the implementation shown in FIG. 3B, user application 344 can be an application installed on the user's device which is not necessarily related to any third party as described above, but rather an application that produces or uses raw data, such as a navigation application, a shopping list application, or the like. User application 344 can be compiled with or otherwise operatively connected to event creation/identification unit 348, which may comprise, invoke, or otherwise connect to third party #1 module 352, third party #2 module 356, or the like, for creating or identifying events required by the respective third parties. Data collection module 336 may be as described in association with FIG. 3A above. Alternatively, data collection module 336 may comprise, call or otherwise connect to specific components for collecting the required information for each third party.

In some exemplary embodiments, the components detailed for user application 344 may be implemented using a Software Development Kit (SDK) that is used by one or more user applications, providing such applications a functionality which tracks their users' sensitive data and utilize it for their needs while preserving users' privacy.

It will be appreciated that the embodiments of FIGS. 3A and 3B are exemplary only, and other embodiments can be designed and used without deviating from the guidelines of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising a non-transitory computer readable storage medium retaining program instructions configured to cause a processor to perform actions, wherein the processor is a processor of a mobile device of a user, wherein the mobile device is in communication with a computing device associated with an entity other than the user, wherein the computing device is in communication with a plurality of mobile devices, each of which retaining the computer program product, wherein the program instructions implement:

subject to an occurrence of an event associated with the user of the mobile device, obtaining data to be transmitted to the computing device,
wherein the event is of interest to the entity,
wherein the event is identified based on sensitive data of the user retained on the mobile device, wherein the sensitive data comprises a user-associated location,
wherein the event is identified by on-board processing of location data by the mobile device, wherein the location data is obtained by a positioning sensor of the mobile device,
wherein the on-board processing is configured to determine a distance between a location of the mobile device and the user-associated location associated with the user of the mobile device,
wherein the event comprises determining, by the mobile device, that the distance complies with a condition,
wherein the data to be transmitted comprises demographic information of the user and a property of the event, wherein a machine learning classifier is utilized by the mobile device for estimating the demographic information based on raw data retained locally on the mobile device, wherein the raw data comprises the location data, wherein the raw data comprises a history of locations of the mobile device, wherein the on-board processing comprises analyzing the history of the locations of the mobile device,
wherein the computing device is not privy to the raw data, wherein the machine learning classifier is trained on a training set before being utilized to perform the demographic information estimation,
wherein the data to be transmitted indicates the distance, wherein the data excludes identifying information that enables to identify the user,
wherein the data excludes geographical coordinates of the user-associated location, wherein the data excludes geographical coordinates of the location of the mobile device; and
transmitting the data to the computing device, whereby enabling the entity to provide a functionality that is based on the sensitive data without transmitting the sensitive data from the mobile device to the computing device.

2. The computer program product of claim 1, wherein the computing device is configured to receive transmissions from the plurality of mobile devices, whereby the computing device collects aggregative anonymous data based on the sensitive data without being privy to the sensitive data relating to each user of each of the plurality of mobile devices.

3. The computer program product of claim 1, wherein the sensitive data comprises one or more locations at which the user was present.

4. The computer program product of claim 1, wherein the event is identified by performing on-board processing by the mobile device of the raw data.

5. The computer program product of claim 1, wherein the location of the mobile device is obtained by the positioning sensor.

6. The computer program product of claim 1, wherein the user-associated location is a home of the user, a work place of the user, a parking spot of the user, or a place the user visits regularly.

7. The computer program product of claim 1, wherein the event comprises presenting to the user a personalized content item based on the distance, wherein the personalized content item is stored in a local repository of the mobile device.

8. The computer program product of claim 1, wherein the event comprises displaying an advertisement to the user based on the distance, and wherein the program instructions further implement matching, by the mobile device, the advertisement to be displayed to the user, wherein said matching is performed on-board the mobile device, with respect to a local repository of advertisements.

9. The computer program product of claim 8, wherein said local repository of advertisements comprises at least one rule indicting for each advertisement a condition for displaying the advertisement.

10. The computer program product of claim 8, wherein said matching is based on the sensitive data, and wherein the computing device is not privy to the sensitive data.

11. The computer program product of claim 10 wherein the sensitive data comprises one or more locations of the mobile device, browsing history, content of messages, content of e-mails or social networks activity.

12. The computer program product of claim 10, wherein the sensitive data is obtained by on-board processing by the mobile device of the raw data.

13. The computer program product of claim 10, wherein said matching is preformed when the mobile device has no network connectivity.

14. The computer program product of claim 1, wherein the event comprises suggesting to the user a specific service or product.

15. The computer program product of claim 14, wherein the specific service or product is suggested based on a current state or action of the user.

16. A method to be performed by a processor of a mobile device of a user, wherein the mobile device is in communication with a computing device associated with an entity other than the user, wherein the computing device is in communication with a plurality of mobile devices, the method comprising:
subject to an occurrence of an event associated with the user of the mobile device, obtaining data to be transmitted to the computing device,
wherein the event is of interest to the entity,
wherein the event is identified based on sensitive data of the user retained on the mobile device,
wherein the sensitive data comprises a user-associated location,
wherein the event is identified by on-board processing of location data by the mobile device, wherein the location data is obtained by a positioning sensor of the mobile device,
wherein the on-board processing is configured to determine a distance between a location of the mobile device and the user-associated location associated with the user of the mobile device,
wherein the event comprises determining, by the mobile device, that the distance complies with a condition,
wherein the data to be transmitted comprises demographic information of the user and a property of the event, wherein a machine learning classifier is utilized by the mobile device for estimating the demographic information based on raw data retained locally on the mobile device, wherein the raw data comprises the location data, wherein the raw data comprises a history of locations of the mobile device, wherein the on-board processing comprises analyzing the history of the locations of the mobile device,
wherein the computing device is not privy to the raw data, wherein the machine learning classifier is trained on a training set before being utilized to perform the demographic information estimation,
wherein the data to be transmitted indicates the distance,
wherein the data excludes identifying information that enables to identify the user,
wherein the data excludes geographical coordinates of the user-associated location,
wherein the data excludes geographical coordinates of the location of the mobile device; and
transmitting the data to the computing device, whereby enabling the entity to provide a functionality that is based on the sensitive data without transmitting the sensitive data from the mobile device to the computing device.

17. A mobile device used by a user, the mobile device comprising a storage device retaining program instructions, wherein the mobile device is in communication with a computing device associated with an entity other than the user, wherein the computing device is in communication with a plurality of mobile devices, each of which retaining the program instructions, wherein the program instructions are configured to cause a processor of the mobile device to:

subject to an occurrence of an event associated with the user of the mobile device, obtain data to be transmitted to the computing device, wherein the event is of interest to the entity, wherein the event is identified based on sensitive data of the user retained on the mobile device, wherein the sensitive data comprises a user-associated location, wherein the event is identified by on-board processing of location data by the mobile device, wherein the location data is obtained by a positioning sensor of the mobile device, wherein the on-board processing is configured to determine a distance between a location of the mobile device and the user-associated location associated with the user of the mobile device, wherein the event comprises determining, by the mobile device, that the distance complies with a condition, wherein the data to be transmitted comprises demographic information of the user and a property of the event, wherein a machine learning classifier is utilized by the mobile device for estimating the demographic information based on raw data retained locally on the mobile device, wherein the raw data comprises the location data, wherein the raw data comprises a history of locations of the mobile device, wherein the on-board processing comprises analyzing the history of the locations of the mobile device, wherein the computing device is not privy to the raw data, wherein the machine learning classifier is trained on a training set before being utilized to perform the demographic information estimation, wherein the data to be transmitted indicates the distance, wherein the data excludes identifying information that enables to identify the user, wherein the data excludes geographical coordinates of the user-associated location, wherein the data excludes geographical coordinates of the location of the mobile device; and transmit the data to the computing device, whereby enabling the entity to provide a functionality that is based on the sensitive data without transmitting the sensitive data from the mobile device to the computing device.

* * * * *